April 5, 1927.
G. C. AUSTIN
1,623,328
PISTON
Filed Oct. 31, 1922
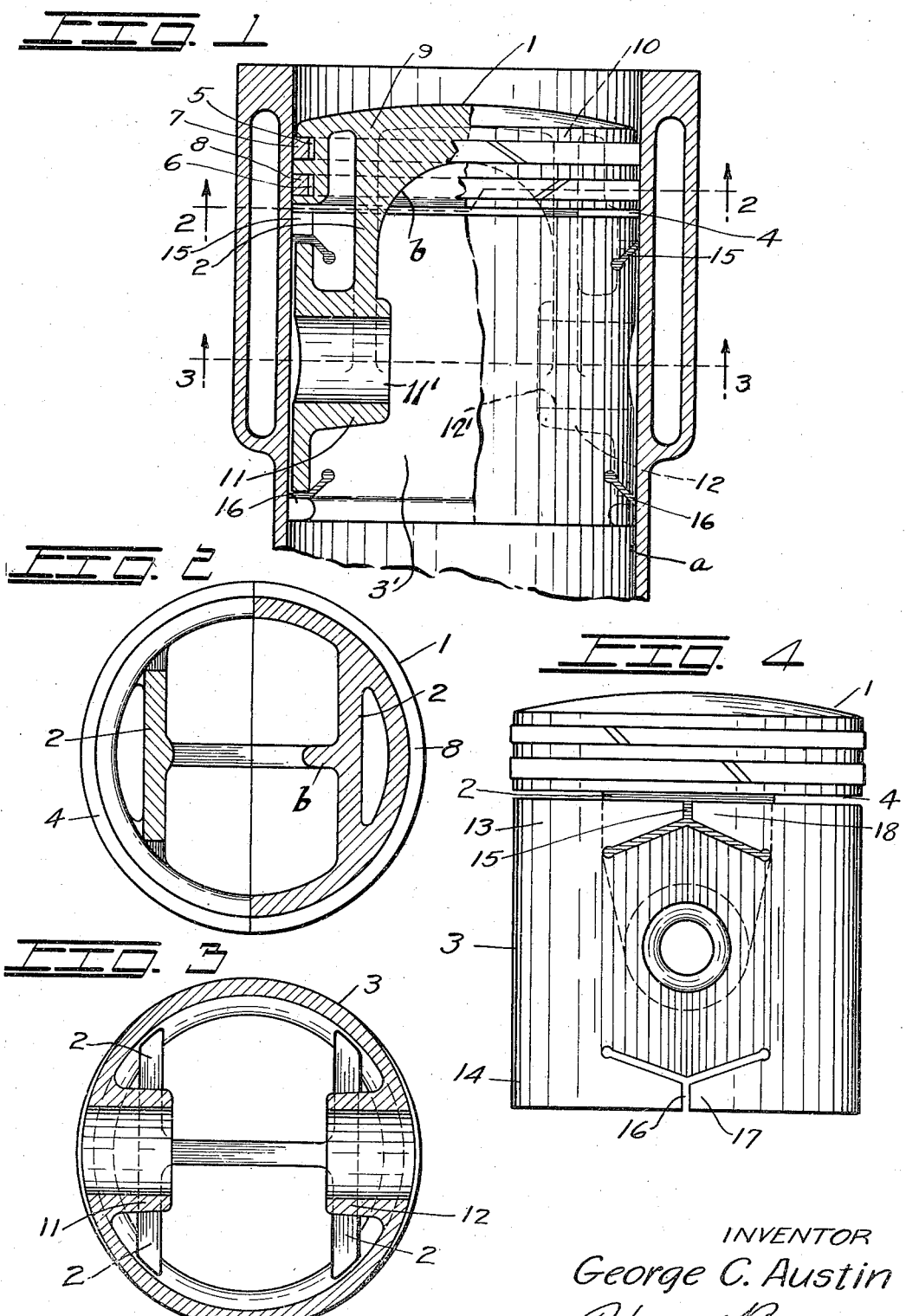
INVENTOR
George C. Austin
Harry Bowen
ATTORNEY Patented Apr. 5, 1927.

1,623,328

UNITED STATES PATENT OFFICE.

GEORGE C. AUSTIN, OF SEATTLE, WASHINGTON, ASSIGNOR, BY MESNE ASSIGNMENTS, OF ONE-HALF TO S. C. CARTER CO., INC., OF LOS ANGELES, CALIFORNIA, A CORPORATION OF CALIFORNIA.

PISTON.

Application filed October 31, 1922. Serial No. 598,153.

The invention is an improvement in the construction of pistons for internal combustion engines wherein unequal expansion and contraction of the piston and cylinder walls are compensated for, which permits the use of a relatively close fitting piston within the cylinder walls, without danger of cramping or binding as the piston expands.

An object of the invention is to so construct a piston that it will have a very small amount of clearance between it and the cylinder walls and which will take up practically all of the expansion that occurs as it is heated and still remain rigid.

Another object of the invention is to so construct a cut-skirt piston that it will not spring, and I accomplish this by providing a portion of its skirt with an oblate or elliptical shape and splitting the remaining circular portion.

With these ends in view the invention embodies a piston having piston rings adjacent its upper end or head, a groove below the rings extending continuously around the piston, longitudinal slots adjacent the groove and the lower end, and an oblate portion between the longitudinal slots.

Other objects, features and advantages of the invention may appear from the following description taken in connection with the drawings, wherein:—

Figure 1 is a section showing a part of a cylinder with a piston in it having one side of the piston broken away on the center line.

Figure 2 is a cross section on irregular line 2—2 of Figure 1.

Figure 3 is a cross section on line 3—3 of Figure 1.

Figure 4 is a side elevation of a piston constructed in accordance with this invention.

In the drawings 1 indicates the piston head which is connected by a web portion or column 2 to the skirt portion 3 which is provided with a chamber 3' and the head portion 1 is separated at its periphery from the skirt portion 3 by an annular slot or groove 4 in the peripheral walls of the head and skirt, and which communicates with said chamber.

As the head of the piston 1 comes into contact with the explosion and absorbs a considerably higher degree of heat than the skirt the diameter of the head 1 is less than that of the skirt 3 to accommodate the greater expansion of the head than of the skirt and thus permit the skirt 3 to be fitted to the cylinder walls $a$ with but a small clearance say about two thousandths of an inch between the peripheries of the piston and cylinder walls, and as the temperature of the piston increases to the working temperature the head will expand a greater distance than the cooler skirt below.

The wall of the head is comparatively thicker than that of the skirt and has annular grooves 5 and 6 in which are piston rings 7 and 8.

It will be seen that the web portion 2 is constructed of two vertical sections that extend downward from the head at the points 9 and 10 and connect to the piston pin hubs 11 and 12 which are in the form of alined integral bosses projecting inwardly into the interior chamber 3' of the skirt and are provided with bearings 11', 12' for the usual wrist pin, not shown. By separating the head from the skirt in this manner the heat from the head will be transmitted to the skirt only through the sections 2 which first transmit it to the hubs 11, 12, and as both the sections 2 and the hubs 11, 12 are subjected to the relatively cooler atmosphere below the piston the temperature of the head will be greatly decreased before it reaches the walls of the skirt portion.

The portion of the skirt to which the heat is transmitted from the head, or that on which the hubs is formed is of an oblate shape as shown in Figure 3 and the smaller diameter is on the axial center line of the wrist pin bearing.

During operation the temperature of the piston head will be increased first and then the temperature of the skirt will be increased by transmitting a portion of the heat from the head to the skirt through the sections 2 and by the heat of the cylinder walls. Because the head receives the direct explosion and is separated from the skirt except at the sections 2 it will attain a higher temperature than the skirt 3 which is cooled by the piston walls $a$. Therefore, the head will expand a greater distance than the skirt which is cooler than the head. The sections 2 being traced by the webs $b$ will force the hubs 11, 12 and the skirt at such points outward beyond the normal expansion of the skirt. When such portion is forced out by the expansion of the head it will approach a practically true circle, the diameter of which will be when fully expended slightly less than the diameter of the cylinder walls. The piston will attain a practically true circle because the smaller diameter of the oblate portion will be forced out and the parts of the piston intersected by a diameter normal to the smaller diameter will be drawn in.

As for example, if the total expansion of the piston head is 10 thousandths of an inch, the sections 2 being spaced apart a distance equal to approximately one-half the diameter of the piston head, the expansion between the sections 2 will be about 5 thousandths of an inch. Whereas the expansion of the skirt portion of a piston, such as shown, will be about 5 thousandths of an inch. But the space between the bosses 11, 12 where the sections 2 connect will expand only ½ the total distance of the skirt expansion or 2½ thousandths of an inch. Therefore, the head between the sections 2 expands twice as much as the skirt portion between such sections, and the additional expansion of the head is transmitted to the skirt portion through the sections 2 and thereby forces the hubs 11 and 12, 2½ thousandths farther apart than their normal expansion. With the piston normally 3 thousandths of an inch from the cylinder walls if the piston were initially round it would "freeze" in the cylinder. However, the oblate section when fully expanded by the piston head, will not touch the cylinder walls, and when such oblate section is forced out it will draw in the skirt on opposite sides of the smaller diameter of the oblate section to prevent such parts from engaging the cylinder walls.

Above and below the oblate section of the skirt are sections 13 and 14 which are perfectly round and of approximately the same diameter as the inside diameter of the cylinder in which the piston is to be used. In each of these sections are vertical slots 15 and 16 which extend inward a short distance from the outer edges in approximate vertical alinement with the axis of said bosses 11, 12, and from the inner ends of each of the slots 15 and 16, other laterally inclined slots extend circumferentially in each direction from the inner end of said vertical slots, as shown in Figure 4, thus leaving tongues 17 and 18 on each side of the slots 15 and 16. These slots permit the skirt portion of the piston to have sections at each end of approximately the same diameter as the inside diameter of the cylinder as when these sections of the skirt expand the increased circumference will be taken up by the slots, and when these sections contract the slots open to the normal position and permit these sections of the piston to remain in approximate engagement with the walls of the cylinder.

It may be understood that changes may be made in the construction without departing from the spirit of the invention. One of which changes may be in the shape of the web portions 2, another may be in the shape of the slots 15 and 16 or of their laterally inclined branches, and still another may be in the type of piston or in the number of rings in it.

The construction will be readily understood from the foregoing description. To use the device it will be placed in a cylinder as shown in Figure 1 and as the explosion occurs the head portion, which is of a smaller diameter than that of the skirt, will expand to approximately the diameter of the cylinder without affecting the skirt; and as the heat is gradually transmitted through the web portion 2 and the hubs 11 to the oblate shaped portion of the skirt, this portion will expand until it is approximately round at which time it will be approximately the same size as the inside of the cylinder. And then as the temperature increases the sections 13 and 14 of the skirt will expand and the width of the slots 15 and 16 will be decreased. Furthermore, it will be seen that as the temperature decreases the sections of the piston will contract relatively and as each approaches its normal shape the piston will continue to fit snugly in the cylinder. Therefore, it will be seen that by constructing a piston of this design it will be possible to use a material having a high coefficient of expansion and provide a piston that will have a very small clearance between it and the cylinder walls, and maintain a comparatively rigid skirt.

Having thus fully described the invention, what I claim as new and desire to secure by Letters Patent, is:—

1. A piston of the class described consisting in a head portion and a skirt portion separated about their peripheral walls and connected together internally by integral members spaced from said walls, said skirt portion having an oblate central portion and short vertical slots extending inwardly from its ends and with other laterally inclined slots extending circumferentially and communicating with said vertical slots.

2. A piston of the class described including a head and skirt separated by an annular slot in their peripheral wall, pairs of vertical slots on opposite sides of said skirt and extending from said annular slot and the lower edge of the skirt, and oblate portions formed on the exterior wall of said skirt between each of said pair of vertical slots.

3. A piston of the class described comprising a head and a skirt spaced apart by an annular slot in their peripheral wall, said head being of smaller diameter than said skirt, aligned integral bosses projecting inwardly into the interior chamber of said skirt, columns integral with said head and the bosses supporting the head, said columns being separated apart from said peripheral wall, pairs of vertical slots on opposite sides of said skirt extending from said annular slot and the lower edge of the skirt in approximate vertical alignment with the axes of said bosses, said slots having angularly directed branches, and oblate portions formed on the exterior wall of said skirt between each of said pairs of vertical slots.

4. A piston of the class described having a continuous groove around its periphery separating its head from its skirt; the head of said piston being of a smaller diameter than the skirt and the skirt of said piston having an oblate shaped section in it midway between its lower and upper end; grooves for rings in the head portion; vertical slots extending inward a short distance from the upper and lower edges of the skirt section which have laterally inclined slots extending from their inner ends; piston pin hubs extending inward from the narrow sides of the oblate section; and webs being integral with the hubs and heads connecting the heads to the skirt portion, said webs having spaces between them and the walls of the skirt portion.

5. A piston of the class described, comprising a head and a skirt spaced apart by an annular slot, oblate portions on said skirt, means connecting said head to said skirt at said oblate portions, a vertical slot extending from the lower edge of said skirt, and a slot extending circumferentially of said skirt from the inner end of said vertical slot.

GEORGE C. AUSTIN.